Patented July 8, 1947

2,423,457

UNITED STATES PATENT OFFICE 2,423,457

PREPARATION OF PARASITICIDAL MIXTURES

George E. Lynn and Bernard J. Thiegs, Midland, Mich., assignors to The Dow Chemical Company, Midland, Mich., a corporation of Michigan No Drawing. Application June 23, 1944, Serial No. 541,848

3 Claims. (Cl. 167—42)

This invention relates to parasiticides and is particularly directed to a method for the preparation of parasiticidal dusts and powders in which an organic toxicant is dispersed on a solid carrier.

The compounding of parasiticidal dusts comprising water-immiscible organic toxicants may be accomplished in a number of ways. Where the toxicant employed is a very high melting solid, it has been conventional practice to grind toxicant and carrier together in order to obtain a homogeneous mixture. Also, toxicant and carrier have been separately ground and thereafter blended to form dust mixtures. Such practices are not entirely satisfactory from the point of view of obtaining uniform dispersions of the toxicant material and are entirely inoperable where either liquid or low melting toxicants are concerned. The liquid toxicant materials are obviously unsuited for comminution, and the temperatures developed in the grinding operation cause the low melting toxicants to soften and pack so that unsatisfactory results are obtained.

Many efforts have been made to provide improved methods of operation whereby water-immiscible liquid and low melting synthetic organic toxicants conveniently may be compounded with finely-divided solid carriers. Perhaps the most promising has been that of dissolving the toxicant in a volatile organic solvent, wetting the carrier with this solution, and thereafter drying the product to drive off the solvent. This procedure gives a product in which the toxicant is evenly distributed throughout the carrier but is wasteful of expensive solvent materials and imparts properties of water-repellency to the ultimate product which are very undesirable where such product must later be dispersed in aqueous spray mixtures.

It is an object of the present invention to provide a method whereby water-immiscible liquid and low melting toxicant materials may be compounded with finely-divided solid carriers. A further object is to provide such a method wherein the use of organic solvents will be avoided. An additional object is to provide a method for producing dust mixtures including water-immiscible organic toxicants and finely-divided solid carrier, which mixtures will be readily wet by water. Other objects will be apparent from the following description and examples.

We have discovered that liquid or low melting water-immiscible organic toxicants conveniently may be compounded with finely-divided solid carriers by first emulsifying the toxicant in water and thereafter wetting the carrier with the emulsion. The operation preferably is carried out by emulsifying the toxicant in liquid form with water and thereafter adding the carrier portionwise and with stirring to the emulsion. The mixture of carrier, toxicant, water, and such emulsifying or dispersing agent as is employed to produce the emulsion, is then dried and the residue ground to any desired degree of fineness. The resulting dust product has the toxicant uniformly distributed therethrough and is readily wet by water.

The new process avoids the use of expensive and flammable solvents and provides for water-immiscible organic toxicants a method of compounding which is comparable with that available for operation with water-soluble toxicants, where it is necessary only to dissolve the toxicant in water and to wet the carrier with the solution. The property of the finished dusts of being readily wet with water avoids problems of wetting and dispersing heretofore encountered with many parasiticidal concentrates, and particularly those prepared by the treatment of finely-divided carrier with solvent solutions of water-immiscible organic toxicants.

When operating in accordance with the present invention, the water and the emulsion mixture must be maintained at a temperature above the melting point of the toxicant throughout both the emulsifying step and the mixing of the finished emulsion with the finely-divided solid carrier. The preferred range of operation runs from about 10° to 100° C. However, if desired, the process can be carried out at higher temperatures under superatmospheric pressure. The toxicant at the temperature of operation is liquid and serves as the disperse or oily phase of the emulsion.

The amount of water employed is not critical provided only that an emulsion of sufficient volume to wet the carrier be produced. In practice, a minimum amount of water is preferred in order that the drying operation be of short duration.

Any suitable dispersing agent can be employed to accomplish the emulsification of the toxicant and water. The exact amount is dependent upon the proportions of water and toxicant, the effectiveness of the particular emulsifying agent selected, and the amount of such agent desired in the ultimate dried composition. Generally, the minimum amount of emulsifier is employed which will accomplish the dispersion of the liquid toxicant and impart to the final dried product the characteristic of wetting readily with water. Suitable emulsifying or dispersing agents include sulfonated fatty acids and their alkali metal salts, metal caseinates, sulfite pulping waste (Goulac), sulfated alcohols, phenols, hydrocarbons, and their salts, complex glyceryl and other esters, ether alcohols, etc.

Any suitable finely-divided solid carrier can be used in carrying out the invention provided only that it be insoluble in water and not reactive with the toxicant. Suitable carriers include diatomaceous earth, pyrophyllite, volcanic ash, talc, wood flours, finely-divided carbon, and gypsum. The exact amount of carrier employed is largely dependent upon the amount of toxicant present in the emulsion and the concentration of toxicant desired in the ultimate composition.

While any liquid or low melting toxicant can be employed in accordance with the present invention, the preferred toxicant is one having a melting point below 100° C. The amount of the toxicant incorporated in the emulsion depends entirely upon the proportion of carrier to be subsequently employed and the percentage of toxicant desired in the ultimate dried and ground product. Representative toxicants include phenothioxin, dinitrocresol, lauryl thiocyanate, 2.4.5-trichloro-phenol, 2.4.5.6 - tetrachloro - phenol, orthophenylphenol, monochloro - orthophenylphenol, 2.4-dinirto-6-secondary butyl-phenol, chloro-phenothioxines, 4-chloro-diphenyloxide, 2.2'-dichloro-diphenyl, chloro-naphthalene, isopropyl-naphthalene, and other synthetic esters, ethers, alcohols, phenols, and halo-hydrocarbons.

The emulsification of the toxicant in water can be carried out in any suitable fashion. Generally the water is heated to a temperature above the melting point of the toxicant and the toxicant and emulsifying agent introduced portion-wise and with agitation into the water. Where desirable, the initial suspension so obtained may be passed through a homogenizer or other mechanical device adapted to produce a fine dispersion of toxicant in the liquid emulsion product. The finely-divided carrier is then added to the emulsion at a temperature above the melting point of the toxicant. An alternate mode of operation consists of adding the emulsion to the carrier. Whichever procedure is followed, the proportions of toxicant, water, and carrier are so selected that the ultimate mixture is a thick slurry of plaster-like consistency. This slurry is then dried either by contact with the air under ordinary temperatures or by warming in a zone of elevated temperature to obtain a residue in which the toxicant and emulsifying agent are uniformly distributed through the carrier. This dried residue is ground or otherwise broken up to obtain a dust mixture of any desired particle size.

The following examples illustrate the invention but are not to be construed as limiting.

*Example 1*

40 parts by weight of di-(4-chlorophenoxy)-methane (melting at 67° C.) and 2 parts of partially neutralized sulphonated sperm oil (Nopco 1216) were stirred and mixed in 60 parts of water at 70° C. to produce an emulsion. 58 parts of finely-divided diatomaceous earth was then added portionwise and with stirring to the liquid product to produce a plaste-like slurry. The temperature of the mixture during the addition of the diatomaceous earth was maintained at 70°-80° C. The product was then removed from the mixer, air-dried, and hammer-milled to obtain a parasiticidal concentrate which is readily wet by water. This product is adapted to be disperesd in water to produce insecticidal spray compositions.

*Example 2*

5 parts by weight of di-(4-chlorophenoxy)-methane and 0.5 part of partially neutralized sulphonated sperm oil (Nopco 1216) were dispersed in 50 parts of water with stirring at 70°-80° C. to form an emulsion. 94.5 parts by weight of finely-divided pyrophyllite was added portionwise and with stirring to the hot emulsion. The resultant mixture was in the form of a plaster-like sludge and was air-dried and hammer-milled to obtain a finely-divided product adapted for use as an insecticidal dust. Also this dust disperses readily in water to produce spray compositions.

*Example 3*

40 parts by weight of phenothioxin and 2 parts of glyceryl mono-ricinoleate were dispersed in 60 parts of water at 65°-70° C. The phenothioxin melted and, with agitation, an emulsion was formed. 58 parts by weight of diatomaceous earth was then added portion-wise to the hot emulsion and stirring and mixing continued at temperatures above 60° C. for a period of an hour. The resulting thick sludge was air-dried and hammer-milled to obtain a fine powder adapted for use in dusting operations or to be dispersed in water to produce spray compositions. The dust composition is not water-repellent but wets readily on contact.

*Example 4*

20 parts by weight of di-(4-chlorophenoxy)-methane, 20 parts of monochloro-phenothioxin, and 2 parts of partially neutralized sulphonated sperm oil were mixed together and added with stirring to 60 parts of water at 70°-80° C. At this temperature the di-(4-chlorophenoxy)-methane and mono-chloro-phenothioxin melted to form an oil which emulsified with the water. 58 parts by weight of diatomaceous earth was then added to the aqueous emulsion. Stirring and mixing of the product was continued for approximately one hour at 70°-80° C. to form a thick slurry or sludge. This product was air-dried and hammer-milled to obtain a fine dust material adapted to be used either as a dust or as a concentrate for the preparation of parasiticidal spray mixtures. The composition wets readily with water.

*Example 5*

40 parts by weight of 2.2-di-(parachlorophenyl)-1.1.1-trichloroethane and 2 parts of an aryl-alkyl-polyether alcohol (marketed as Triton Ne) were dispersed in 60 parts of water and the mixture stirred and heated to boiling temperature. The 2.2-di-(parachlorophenyl)-1.1.1-trichloroethane began to melt at about 90° C. and was completely liquid at 99° C. This oily liquid formed an emulsion with the water. 58 parts of finely-divided diatomaceous earth was stirred into the hot emulsion to form a thick paste. This product was air-dried and ground to obtain an insecticidal concentrate which wet readily with water and was adapted to be employed in the preparation of aqueous spray mixtures.

*Example 6*

Other compositions which may be prepared substantially as described in the foregoing examples include the following:

Composition A:

| | Parts by weight |
|---|---|
| 2.4.5-trichlorophenol | 10 |
| Talc | 88 |
| Sodium lauryl sulphate | 2 |

An emulsion is prepared by stirring and mixing the 2.4.5-trichlorophenol and sodium lauryl sulphate in water at 60°–70° C., and the talc thereafter added with stirring. The resulting mixture is air-dried and the residue ground. The ground composition is adapted to be employed as a fungicide and germicide and can be used either as a dust or dispersed in water as a spray composition.

Composition B:                                    Parts by weight
    Gamma-(4-chlorophenoxy)-propyl thiocyanate ------------------------------ 5
    Glyceryl oleate ------------------------ 1
    Volcanic ash -------------------------- 94

This composition is adapted to be employed as a dust for the control of lice and ticks on domestic animals and also as a fly powder. Also, it may be dispersed in water to give an aqueous spray composition for the control of agricultural insects such as Colorado potato beetle, poplar aphid, etc. The dust mixture is prepared by mixing together the gamma-(4-chlorophenoxy)-propyl thiocyanate and glyceryl oleate and adding this mixture with stirring to water at 40° C. to produce an aqueous emulsion. The volcanic ash is then added portion-wise with stirring to the emulsion to produce a thick plaster-like sludge. This sludge is air-dried and hammer-milled to produce the desired parasiticidal dust product.

Composition C:                                    Parts by weight
    2-phenyl-phenol ----------------------- 40
    Sodium lauryl sulphate ---------------- 2
    Gypsum -------------------------------- 58

This composition is prepared by dispersing the 2-phenyl-phenol and sodium lauryl sulphate in water at 70° C. to produce an emulsion. This emulsion is thereafter added to the gypsum portion-wise and with stirring at 70°–80° C. The resulting thick slurry is air-dried and hammer-milled to obtain a finely-divided powder adapted to be employed as an antiseptic or germicidal dust.

Composition D:                                    Parts by weight
    2,4-dinitro-6-methyl-phenol ----------- 4
    Partially neutralized sulphonated sperm oil ---------------------------------- 2
    Diatomaceous earth ------------------- 94

The 2.4-dinitro-6-methyl-phenol and partially neutralized sulphonated sperm oil are dispersed with stirring in water at 95° C. to produce an aqueous emulsion. 94 parts of diatomaceous earth is then added to the mixture and the resultant thick plaster-like sludge is air-dried and hammer-milled to form a dust composition adapted for use in the control of fungous organisms such as *Fomes annosus* and those causing brown rot and water rot on citrus, as well as common insect pests such as Colorado potato beetle, red spider, and the like.

We claim:
1. The method for preparing parasiticidal dusts and powders which includes the steps of emulsifying a water-insoluble organic toxicant in water at a temperature above the melting point of the toxicant, wetting a finely-divided solid carrier with the emulsion to form a plaster-like slurry, drying the mixture, and grinding the dried residue.

2. The method for preparing parasiticidal dusts and powders which includes the steps of emulsifying a water-insoluble organic toxicant in water at a temperature above the melting point of the toxicant, adding to the emulsion with agitation an amount of finely-divided solid carrier sufficient to form a plaster-like slurry, drying the mixture, and grinding the dried residue.

3. The method for preparing parasiticidal dusts and powders which includes the steps of dispersing a water-insoluble organic toxicant and an emulsifying agent in water at a temperature above the melting point of the toxicant, adding to the resulting liquid emulsion with agitation an amount of a finely-divided solid carrier sufficient to form a plaster-like slurry, drying the mixture, and grinding the dried residue.

GEORGE E. LYNN.
BERNARD J. THIEGS.

REFERENCES CITED

The following references are of record in the file of this patent:

UNITED STATES PATENTS

| Number | Name | Date |
| --- | --- | --- |
| 1,617,255 | Jacobsen | Feb. 8, 1927 |
| 2,161,462 | Flenner | June 6, 1939 |
| 2,217,358 | Coltof | Oct. 8, 1940 |
| 2,330,227 | Lynn | Sept. 28, 1943 |
| 2,330,234 | Moyle | Sept. 28, 1943 |